(12) United States Patent
Hudman et al.

(10) Patent No.: US 9,297,889 B2
(45) Date of Patent: Mar. 29, 2016

(54) ILLUMINATION LIGHT PROJECTION FOR A DEPTH CAMERA

(75) Inventors: Joshua Mark Hudman, Issaquah, WA (US); Prafulla Masalkar, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 817 days.

(21) Appl. No.: 13/585,638

(22) Filed: Aug. 14, 2012

(65) Prior Publication Data

US 2014/0049610 A1 Feb. 20, 2014

(51) Int. Cl.
| | |
|---|---|
| H04N 13/00 | (2006.01) |
| H04N 7/18 | (2006.01) |
| G01S 7/481 | (2006.01) |
| G01S 17/89 | (2006.01) |
| A62B 1/04 | (2006.01) |
| A61B 1/04 | (2006.01) |
| A61B 1/06 | (2006.01) |
| G03H 1/00 | (2006.01) |

(52) U.S. Cl.
CPC .............. *G01S 7/4814* (2013.01); *G01S 17/89* (2013.01)

(58) Field of Classification Search
USPC .................. 348/61, 64, 67, 68, 76, 42; 359/1; 362/553
See application file for complete search history.

(56) References Cited

U.S. PATENT DOCUMENTS

| | | | | |
|---|---|---|---|---|
| 5,013,133 | A | * | 5/1991 | Buralli et al. ................. 359/558 |
| 6,870,650 | B2 | * | 3/2005 | Kappel et al. .................. 359/15 |
| 8,803,967 | B2 | * | 8/2014 | Oggier et al. ................. 348/135 |
| 8,854,426 | B2 | * | 10/2014 | Pellman et al. ................. 348/42 |
| 2001/0022566 | A1 | | 9/2001 | Okazaki |
| 2002/0075460 | A1 | | 6/2002 | Kappel et al. |
| 2003/0053513 | A1 | | 3/2003 | Vatan et al. |
| 2004/0037450 | A1 | * | 2/2004 | Bradski ......................... 382/103 |
| 2006/0023173 | A1 | | 2/2006 | Mooradian et al. |

(Continued)

FOREIGN PATENT DOCUMENTS

| | | |
|---|---|---|
| CN | 1758083 A | 4/2006 |
| CN | 101009749 A | 8/2007 |

(Continued)

OTHER PUBLICATIONS

Unold, et al., "Single-Mode VCSELs", Retrieved at <<http://lib.semi.ac.cn:8080/tsh/dzzy/wsqk/SPIE/vol4649/4649-218.pdf>>, Proceedings of SPIE vol. 4649, Jun. 4, 2002, pp. 218-229.
"ADNS-9500 Eye Safety Calculations", Retrieved at <<http://www.avagotech.com/docs/AV02-1742EN>>, Retrieve Dated: May 10, 2012, pp. 1-9.

(Continued)

*Primary Examiner* — Daquan Zhao
(74) *Attorney, Agent, or Firm* — Gregg Wisdom; Judy Yee; Micky Minhas

(57) ABSTRACT

Various embodiments of TOF depth cameras and methods for illuminating image environments with illumination light are provided herein. In one example, a TOF depth camera configured to collect image data from an image environment illuminated by illumination light includes a light source including a plurality of surface-emitting lasers configured to generate coherent light. The example TOF camera also includes an optical assembly configured to transmit light from the plurality of surface-emitting lasers to the image environment and an image sensor configured to detect at least a portion of return light reflected from the image environment.

7 Claims, 7 Drawing Sheets

(56) References Cited

U.S. PATENT DOCUMENTS

| | | | |
|---|---|---|---|
| 2007/0177270 A1 | 8/2007 | Dickson et al. |
| 2008/0084542 A1 | 4/2008 | Lalley et al. |
| 2010/0277699 A1 | 11/2010 | Silverstein et al. |
| 2011/0176146 A1 | 7/2011 | Alvarez Diez et al. |
| 2011/0279648 A1 | 11/2011 | Lutian et al. |
| 2012/0051588 A1 | 3/2012 | McEldowney et al. |
| 2012/0082346 A1 | 4/2012 | Katz et al. |
| 2012/0154542 A1 | 6/2012 | Katz et al. |

FOREIGN PATENT DOCUMENTS

| | | | |
|---|---|---|---|
| CN | 201293863 Y | 8/2009 |
| CN | 101681056 A | 3/2010 |
| CN | 102129152 A | 7/2011 |
| CN | 102402003 A | 4/2012 |

OTHER PUBLICATIONS

"Focusing and Collimating", Retrieved at <<http://www.newport.com/Focusing-and-Collimating/141191/1033/content.aspx>>, Retrieved Date: May 10, 2012, pp. 1-3.

Leonard, et al., "Low-divergence singlemode 1.55 μm VCSEL with 1 mW output power", Retrieved at <<http://ieeexplore.ieee.org/stamp/stamp.jsp?tp=&arnumber=1182351>>, Proceedings of Electronics Letters, vol. 39 No. , Jan. 9, 2003, pp. 59-61.

ISA European Patent Office, International Search Report and Written Opinion of PCT/US2013/053539, Oct. 25, 2013, 10 pages.

European Patent Office, Office Action issued in European Patent Application no. 13750224.1, Dec. 23, 2015, Germany, 5 pages.

The State Intellectual Property Office of China, First Office Action issued in Chinese Patent Application No. 201380043199.X, Jan. 7, 2016, China, 16 pages.

* cited by examiner

ILLUMINATION LIGHT PROJECTION FOR A DEPTH CAMERA

BACKGROUND

In a time-of-flight (TOF) depth camera, light pulses are projected from a light source to an object in an image environment that is focused onto an image sensor. It can be difficult to fill the image environment with illumination light, as the image environment may have a sizeable volume and may have a cross-sectional shape (e.g. rectangular) that can be difficult to achieve with a desired intensity profile. Further, the imaging optics may have a large depth of field in which a consistent projected light intensity is desired.

Some previous approaches to filling image environments with light use high-order optics to shape diverging light emitted from side-emitting light sources. However, such approaches typically require precise design and manufacturing control of the angular distribution of the light in order to fill the image environment.

SUMMARY

Various embodiments related to illuminating image environments with illumination light for a TOF depth camera are provided herein. For example, one embodiment provides a TOF depth camera configured to collect image data from an image environment illuminated by illumination light is provided. The TOF camera includes a light source including a plurality of surface-emitting lasers configured to generate coherent light. The TOF camera also includes an optical assembly configured to transmit light from the plurality of surface-emitting lasers to the image environment and an image sensor configured to detect at least a portion of return light reflected from the image environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
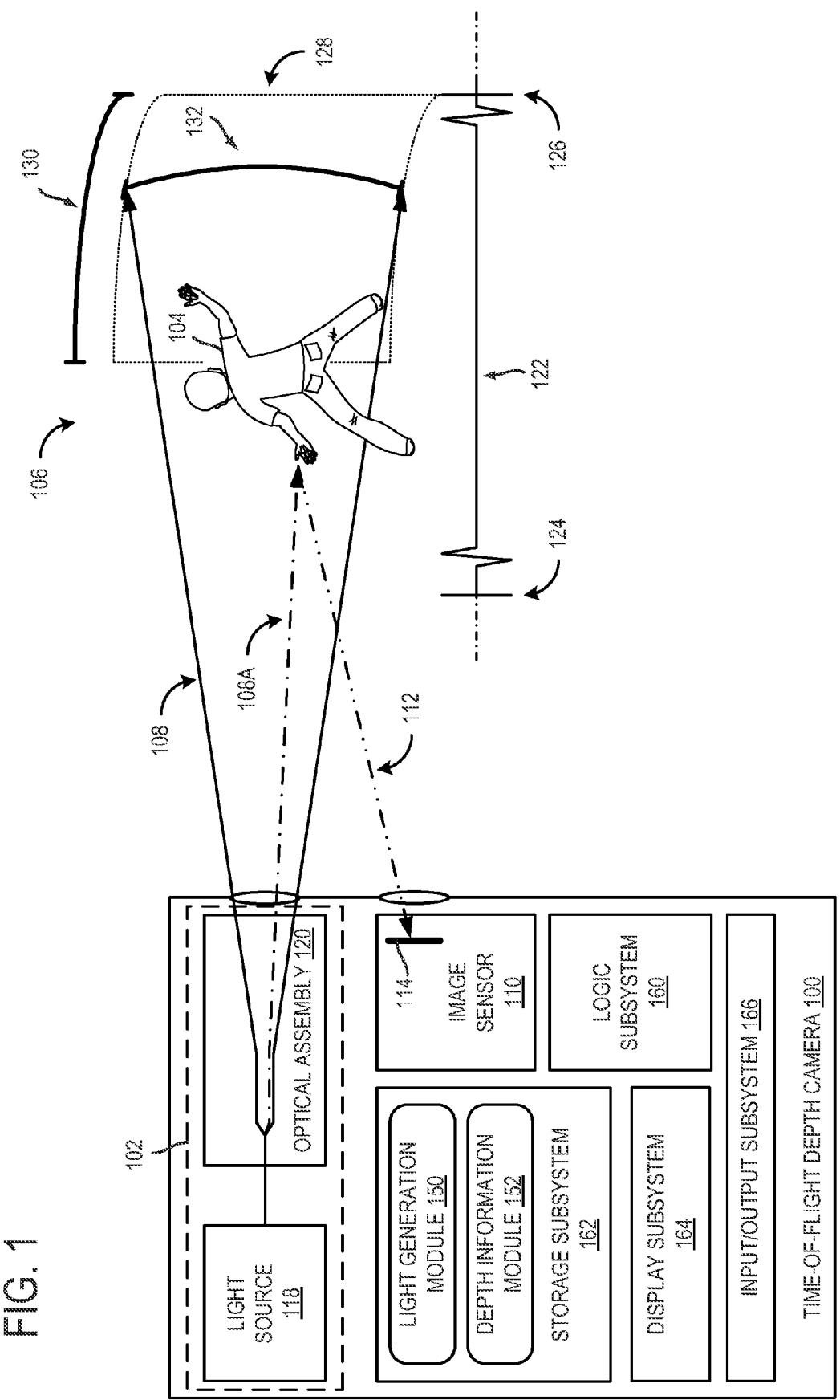
FIG. 1 schematically shows an example time-of-flight (TOF) depth camera in an example use environment according to an embodiment of the present disclosure.

As mentioned above, a TOF depth camera utilizes light pulses (e.g. infrared and/or visible light) projected from the TOF depth camera into an image environment. The illumination light pulses reflect from the various surfaces of objects in the image environment and are returned to an image sensor. The TOF depth camera generates distance data by quantifying time-dependent return light information. In other words, because light is detected sooner when reflected from a feature nearer to the photosensitive surface than from an object feature farther away, the TOF depth camera can determine distance information about the object's features.

It may be difficult to fill the image environment with illumination light of a desired intensity profile. For example, it may be desirable for the intensity of the project light to be somewhat greater in a region near a periphery of the image environment than in a center of the imaging environment, as light reflected from those regions may have a lower intensity at the image sensor due to the angle of incidence on the imaging optics.

Further, as mentioned above, the imaging environment may have a different cross-sectional shape than light emitted by the light source. The imaging environment also may be relatively large to capture potentially large ranges of movements of potentially multiple users.

Illumination sources used with TOF depth cameras may emit light in circular patterns or circularly-shaped emission envelopes. Therefore, overlaying a circularly-shaped emission pattern onto a non-circular image environment in a manner that achieves a relatively uniform illumination intensity across the entire non-circular image environment may result in the illumination of portions of the environment that are not used for depth analysis. This may waste light source power, and also may involve the use of a more powerful and expensive light source.

Some previous approaches to reshaping illumination light employ random distributions of spherical microlenses. By randomly distributing the microlenses, the shape of the emitted light may be adjusted while avoiding the introduction of diffractive interference that may result from a periodic arrangement of microlenses. However, because the microlenses are randomly sized, the ability to control the distribution of light within the image environment, including the light's cross-sectional profile and the dimensions of the envelope that it illuminates within the room, may be compromised.

Accordingly, various embodiments of TOF depth cameras and methods for illuminating image environments with illumination light are provided herein. For example, in some embodiments, a TOF depth camera includes a light source including a plurality of surface-emitting lasers configured to generate coherent light. The example TOF camera also includes an optical assembly configured to transmit light from the plurality of surface-emitting lasers to the image environment and an image sensor configured to detect at least a portion of return light reflected from the image environment. The plurality of surface-emitting lasers may be arranged in a desired illumination light shape, thereby allowing an image of the shape of the light source to be relayed into the image environment. In other embodiments, a homogenizing light guide may be configured to provide a shaped light source for such use.

FIG. 1 schematically shows an embodiment of a TOF depth camera 100. In the embodiment shown in FIG. 1, TOF depth camera 100 includes an illuminator 102 configured to illuminate a portion of an object 104 positioned in an image environment 106 with illumination light 108. For example, a ray of illumination light 108A striking a portion of object 104 is reflected as return light 112. Photons from return light 112 may be collected and used to generate depth information for object 104, as explained in detail below.

While the example shown in FIG. 1 depicts a single illuminator 102 included within TOF depth camera 100, it will be appreciated that a plurality of illuminators 102 may be included within TOF depth camera 100 to illuminate an image environment.

TOF depth camera 100 also includes an image sensor 110 configured to detect at least a portion of return light 112 reflected from image environment 106. Image sensor 110 includes a detector 114 for collecting return light 112 for use in generating depth information (such as a depth map) for the scene.

In the embodiment shown in FIG. 1, illuminator 102 includes a light source 118 configured to generate coherent light and an optical assembly 120 configured to shape the coherent light and direct it toward image environment 106. Light source 118 may emit coherent light at any suitable wavelength(s), including but not limited to infrared and visible wavelengths.

Figure 2:
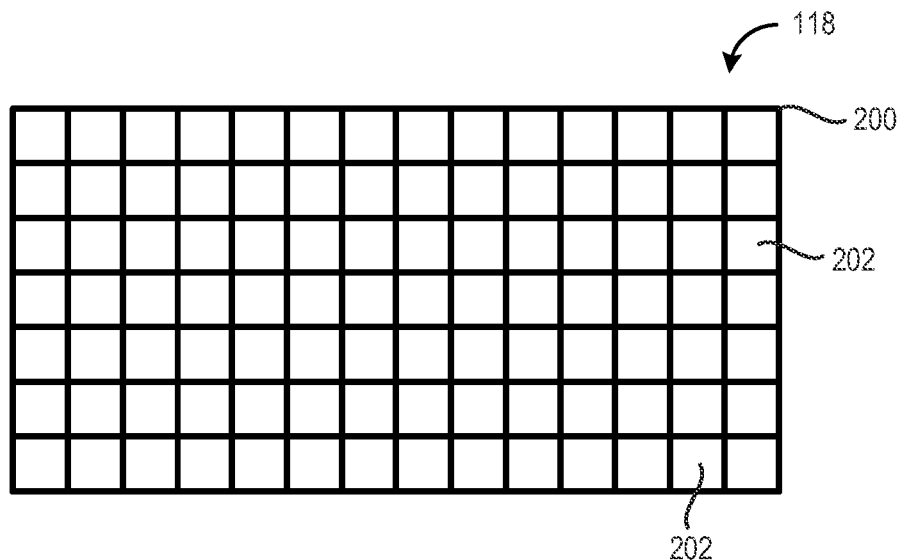
FIG. 2 schematically shows an example light source according to an embodiment of the present disclosure.

FIG. 2 schematically shows an embodiment of light source 118 including a laser array 200 comprising a plurality of individual surface-emitting lasers 202. It will be appreciated that laser array 200 may have any suitable shape without departing from the scope of the present disclosure. In the embodiment shown in FIG. 2, laser array 200 has a rectangular/oblong shape, which matches a desired illumination light cross-sectional shape. It will be appreciated that a plurality of surface-emitting lasers 202 may have any other suitable shape and/or pattern.

Surface-emitting lasers 202 may be fabricated on a suitable substrate (e.g., GaAs) using large-scale integration techniques (e.g., film deposition and film patterning techniques). In some examples, a die comprising a laser array 200 may include hundreds or more of surface-emitting lasers 202. For example, a 1.5 mm square die including surface-emitting lasers 202 that have a center-to-center pitch of approximately 44 µm may include up to 1156 surface-emitting lasers 202.

Figure 3:
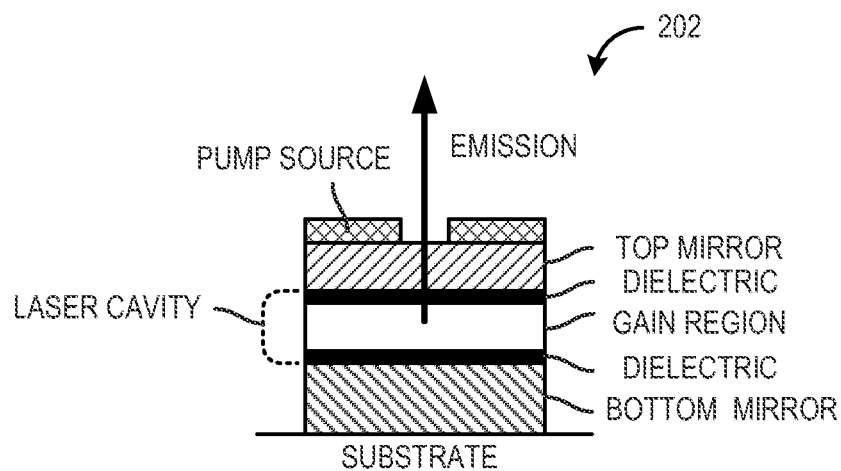
FIG. 3 schematically shows an example surface-emitting laser according to an embodiment of the present disclosure.

FIG. 3 schematically shows a cross-sectional view of an embodiment of a surface-emitting laser 202. Specifically, the embodiment of surface-emitting laser 202 shown in FIG. 3 is a vertical-cavity surface-emitting laser (VCSEL). A VCSEL is a semiconductor laser diode that emits laser light perpendicular from a substrate surface on which the VCSEL is formed. Light or current is pumped into the VCSEL via a pump source to excite the active laser medium (e.g., the material suited to stimulated emission in response to the pump source—one non-limiting example includes InGaAs) in the gain region. The energy injected into the gain region resonates between two mirrors prior to emission. For example, the light may reflect between two distributed Bragg reflectors formed from alternating layers of high- and low-refractive index films. In some embodiments, the top and bottom mirrors may be isolated from the gain region by an insulating dielectric layer.

Figure 4:
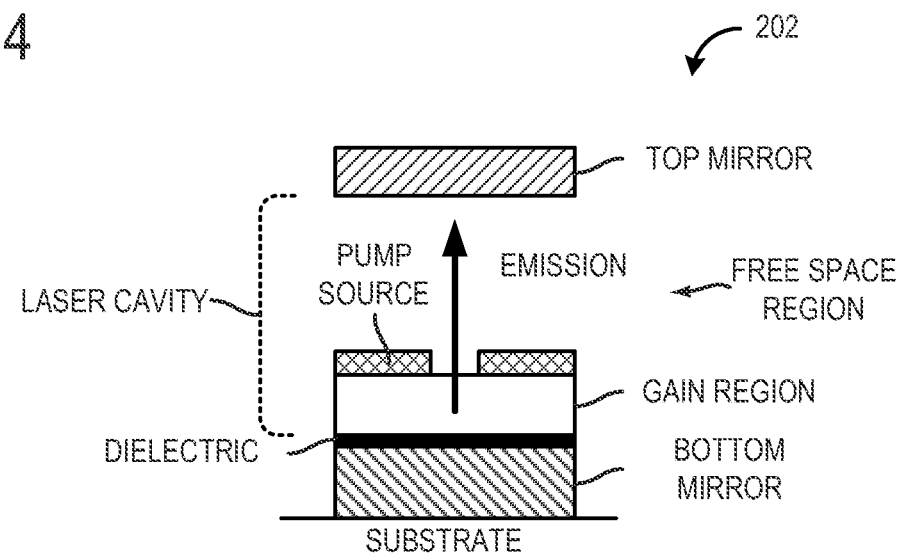
FIG. 4 schematically shows another example surface-emitting laser according to an embodiment of the present disclosure.

Another embodiment of a surface-emitting laser 202 is shown in FIG. 4. Like FIG. 3, FIG. 4 depicts a VCSEL. However, the laser shown in FIG. 4 includes a free-space region between the top and bottom mirrors, a configuration sometimes referred to as a vertical external cavity surface-emitting laser (VECSEL). Because a VECSEL includes a free-space region, the diode may generate a higher power compared to a similar VCSEL.

Turning back to FIG. 1, optical assembly 120 transmits light generated by light source 118 to illuminate a portion of image environment 106. For purposes of discussion, the lit portion of image environment 106 may be broken down into an illumination depth region and an illumination envelope region. The illumination depth region refers to a depth of focus of the projected light. In the embodiment shown in FIG. 1, illumination light 108 is relayed to an illumination depth region 122 bounded by a near edge 124 and a far edge 126. For example, in some embodiments, illumination depth region 122 may be approximately 3.5 m deep.

The illumination envelope region refers to a cross-sectional area that is lit with illumination light 108. In the embodiment shown in FIG. 1, a rectangularly-shaped illumination envelope region 128 is represented with horizontal dimension 130 and with vertical dimension 132. However, it will be appreciated that any suitably shaped illumination envelope region 128 (e.g., an elliptical shape, a polygon shape, or other closed shape) may be formed without departing from the scope of the present disclosure.

As mentioned above, in some embodiments, the lasers included in light source 118 may be arranged in a shape that matches that of a desired emission envelope (e.g., a shape or pattern of light projected by the lasers), and optical assembly 120 may be configured to transmit or relay that shape to the far field. In such embodiments, the emission envelope and illumination envelope region 128 may take the shape of the arrangement of the lasers. Thus, as one specific example, a rectangularly-shaped array of surface-emitting lasers may be used to generate a rectangularly-shaped light envelope in the far field. In other embodiments, optical assembly 120 may be configured re-shape the emission envelope. For example, light emitted from square arrangement of surface-emitting lasers may be reshaped into a rectangularly-shaped light envelope in the far field.

Further, in some embodiments, optical assembly 120 may shape the cross-sectional light intensity/irradiance profile of illumination light 108 from a Gaussian profile into a differently-shaped illumination profile. For example, in some embodiments, illumination light 108 may be shaped into an illumination profile exhibiting a flat-topped, mesa-like shape that is symmetrically oriented around an optical axis of illumination light 108. In such embodiments, the irradiance of illumination light 108 may have a constant intensity, within an acceptable tolerance, in a region near the optical axis (e.g., a region corresponding to a top of the mesa). The irradiance may then decrease in intensity in region farther from the optical axis (e.g., a region corresponding to sidewalls of the mesa).

Figure 5:
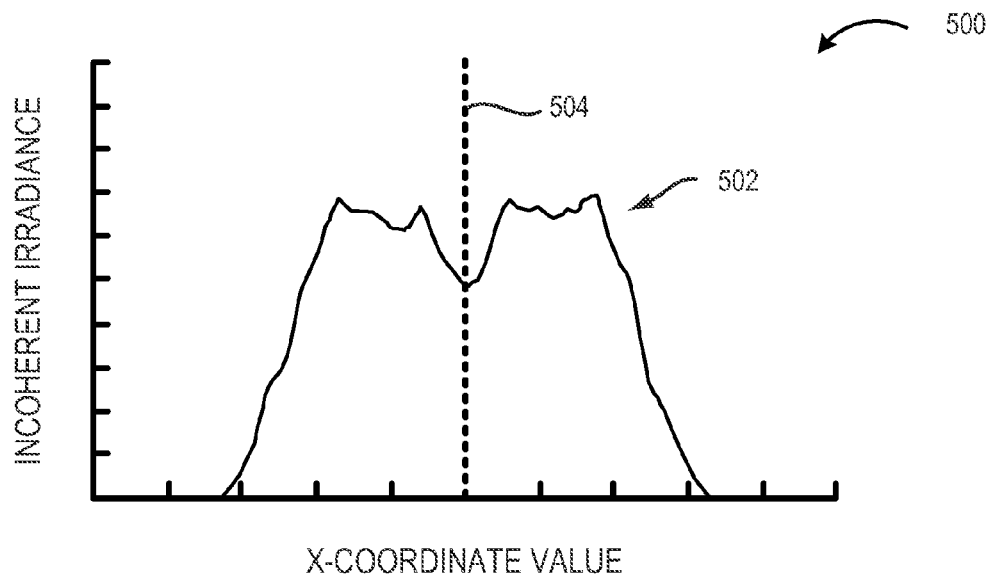
FIG. 5 shows an example illumination profile according to an embodiment of the present disclosure.

In some other embodiments, illumination light 108 may be characterized by a cross-sectional light profile that is more intense farther from an optical axis of illumination light 108 than closer to an optical axis of the illumination light. FIG. 5 shows an embodiment of a relationship 500 between incoherent irradiance and cross-sectional position within an example light profile 502 for illumination light. In the example shown in FIG. 5, light profile 502 exhibits a greater irradiant intensity in a region farther from optical axis 504 than at positions closer to optical axis 504. Metaphorically, light profile 502 exhibits cross-sectional irradiance profile somewhat resembling a capital letter "M" arranged about optical axis 504.

Without wishing to be bound by theory, generating an "M"-shaped profile for the illumination light may offset a "W"-shaped intensity profile received at image sensor 110 due to reflection effects caused by objects in the image environment. In other words, the net effect of supplying light with an "M"-shaped profile to image environment 106 may be that image sensor 110 detects return light having a mesa-shaped profile.

Figure 6:
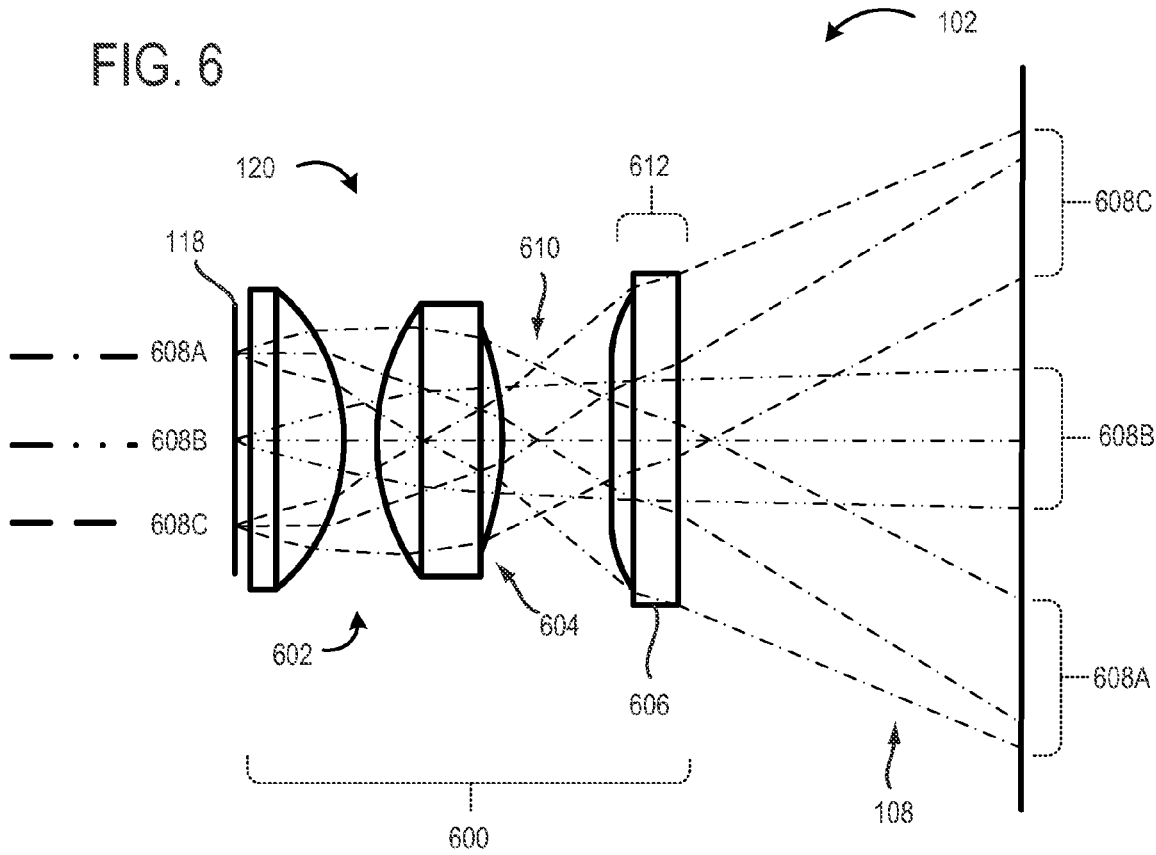
FIG. 6 schematically shows an example lens system according to an embodiment of the present disclosure.

FIG. 6 schematically shows an embodiment a lens system 600 configured to relay an image of light source 118 into image environment 106. Lens system 600 includes a condenser lens stage 602, a relay lens stage 604, and an optional Schmidt plate 606, each of which is described in more detail below.

FIG. 6 also depicts an example light source 118 comprising three light emitters. As used herein, a light emitter may comprise one or more surface-emitting lasers. For example, a single light emitter may comprise a single VCSEL, a single array of VCSELs (whether distributed in an ordered manner or a random fashion within the array), etc. Light from the three emitters is directed (shown as light paths 608A, 608B, and 608C in FIG. 6) via lens system 600 so that light from each emitter is collimated and then routed to different regions of the far field. In this manner, lens system 600 fills illumination envelope region 128 with light by directing light from each surface-emitting laser element to different areas within illumination envelope region 128.

Lens system 600 may utilize a high f-number aperture stop 610 to achieve a desired depth of field for the relayed image source light in the illumination depth region 122. In some non-limiting embodiments, f-numbers in a range of f/250 to f/1000 may be used to provide an illumination depth region having a depth of field in a corresponding range of 500 to 3500 mm.

Condenser lens stage 602 is positioned within lens system 600 to receive light from light source 118, condensing divergent rays of the emitted light and forming aperture stop 610. In some embodiments, condenser lens stage 602 may be configured to condense the light received without magnifying or demagnifying the light beyond an acceptable tolerance. Additionally or alternatively, in some embodiments, condenser lens stage 602 may be configured to impart or shape the light received into a selected light illumination profile. For example, condenser lens stage 602 may distort light received from light source 118 to generate the "M"-shaped profile described above, or any other suitable cross-sectional illumination profile.

Relay lens stage 604 is positioned to receive light from condenser lens stage 602 and relay an image of light source 118 into illumination depth region 122. Stated differently, relay lens stage 604 provides the power within lens system 600 to transmit the image of light source 118 into image environment 106, forming and lighting illumination envelope region 128.

In some embodiments, an optional Schmidt plate 606 may be included within lens system 600, positioned at an entrance pupil 612 of lens system 600. Schmidt plate 606 may be used to introduce aberrations to illumination light to reduce the intensity of diffraction artifacts that may be introduced by surface-emitting lasers 202. Further, Schmidt plate 606 may help to achieve a desired light illumination profile. For example, including Schmidt plate 606 may emphasize peaks and valleys within an "M"-shaped illumination profile imparted by condenser lens stage 602. As the defocusing effect of Schmidt plate 606 may impact the collimating effect of condenser lens stage 602, potentially reducing depth of illumination depth region 122, inclusion of Schmidt plate 606 may be accompanied by a compensatory adjustment to the f-number of lens system 600.

While lens system 600 depicts classical lenses for clarity, it will be appreciated that any suitable embodiment of the lens stages described above may be included within lens system 600 without departing from the scope of the present disclosure. For example, in some embodiments, wafer-level optics may be employed for one or more of the lens stages. As used herein, a wafer optic structure refers to an optical structure formed using suitable formation and/or patterning processes like those used in semiconductor patterning. Wafer-level optics may offer the potential advantage of cost-effective miniaturization of one or more of the lens stages and/or enhance manufacturing tolerances for such stages.

Figure 7:
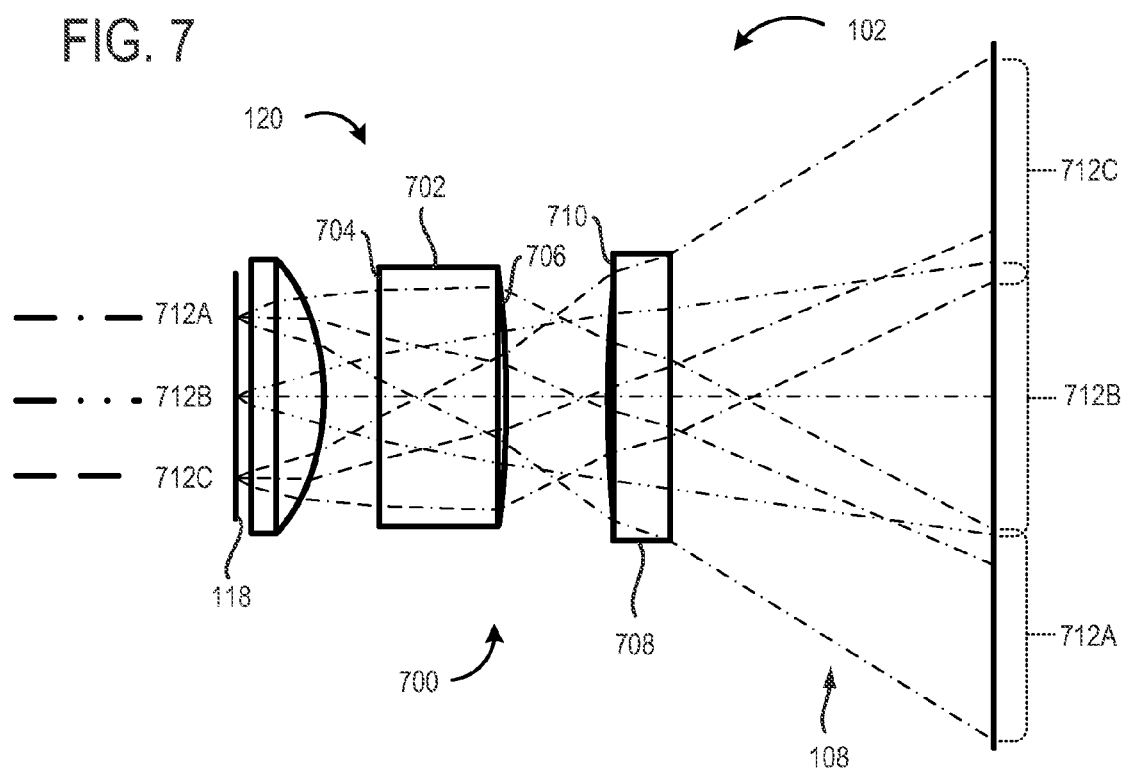
FIG. 7 schematically shows another example lens system according to an embodiment of the present disclosure.

FIG. 7 schematically shows another embodiment of an example lens system 700 for illuminator 102. In the embodiment shown in FIG. 7, wafer optic element 702 encodes a prescription for a portion of a condenser lens stage on a light receiving surface 704 and a prescription for a relay lens stage on light emitting surface 706. Wafer optic element 708 encodes a prescription for a Schmidt plate on light receiving surface 710. In the example shown in FIG. 7, the light distributed by lens system 700 is less collimated relative to the light distributed by the embodiment of lens system 600 shown in FIG. 6, leading to overlap of the light paths 712A, 712B, and 712C in the far field.

While lower levels of collimation may spread illumination light 108 over a greater area, that spreading be accompanied by a reduction in illumination depth region 122. Accordingly, in some embodiments, a lens system may be formed using diffractive optics. If diffractive optical elements are employed for one or more of the lens elements/stages included in the lens system, a diffractive optic substrate will have a prescription for those stages encoded on a respective surface of the substrate. In some embodiments, for example, a single substrate may have a light receiving surface that encodes a prescription for one lens stage and a light emitting surface that encodes a prescription for another lens stage. Because the working surface of a diffractive optic is comparatively thinner than a classical lens analog, which may have a thickness set by a radius of curvature for the classical lens, the diffractive optic may offer similar potential miniaturization enhancements to wafer optics, but may also preserve collimation and depth of field. Moreover, in some embodiments, diffractive optics may permit one or more optical elements to be removed.

Figure 8:
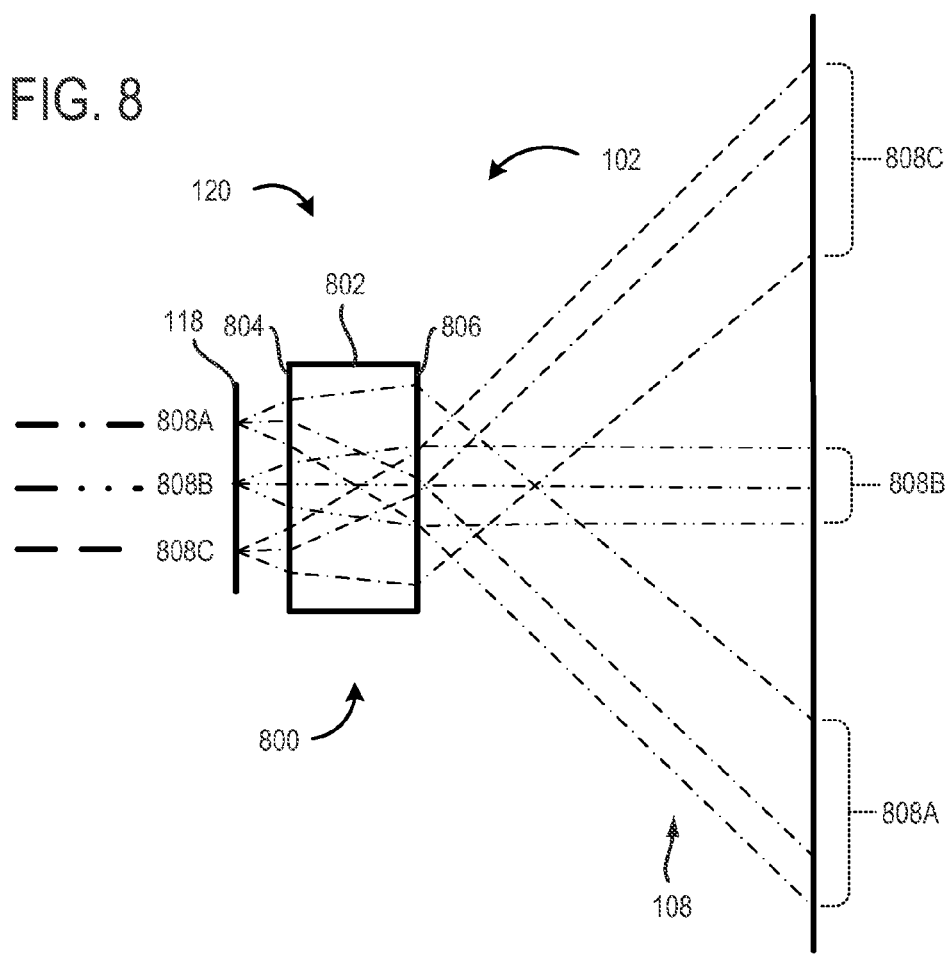
FIG. 8 schematically shows another example lens system according to an embodiment of the present disclosure.

FIG. 8 schematically shows another embodiment of a lens system 800 suitable for use with illuminator 102. In the embodiment shown in FIG. 8, diffractive optic element 802 encodes a prescription for a condenser lens stage on a light receiving surface 804 and a prescription for a relay lens stage on light emitting surface 806. A Schmidt plate is not included in the example illuminator 102 shown in FIG. 8. In the example shown in FIG. 8, the light distributed by lens system 800 may be more highly collimated relative to the light distributed by the embodiment of lens system 600 shown in FIG. 6.

It will be appreciated that the relative positions of the optical stages described above may be varied in any suitable manner without departing from the scope of the present disclosure. For example, in some embodiments, one or more of the optical stages may be varied to increase the apparent size of light source 118. Increasing the size of light source 118 may reduce a user's ability to focus on the light source (e.g., by making the light source appear more diffuse) and/or may avoid directly imaging light source 118 on a user's retina. As a non-limiting example, some systems may be configured so that an image of light source 118 may not be focused on a user's retina when the user's retina is positioned within 100 mm of light source 118.

In some embodiments, increasing the apparent source size may include positioning relay lens stage 604 closer to light source 118, which may cause illumination light 108 to diverge faster, depending upon the configuration of the relay lens stage 604 and light source 118. Because this adjustment may also lead to an increase in the field of view and a decrease in illumination depth region 122, a prescription and/or position for condenser lens stage 602 may also be adjusted to adjust the focal length of optical assembly 120 while the arrangement and pitch of surface-emitting lasers 202 included within light source 118 may be varied to adjust illumination envelope region 128. In some embodiments, optical assembly 120 may also be configured to transform the emission envelope into a different shape while relaying the light to image environment 106.

Figure 9:
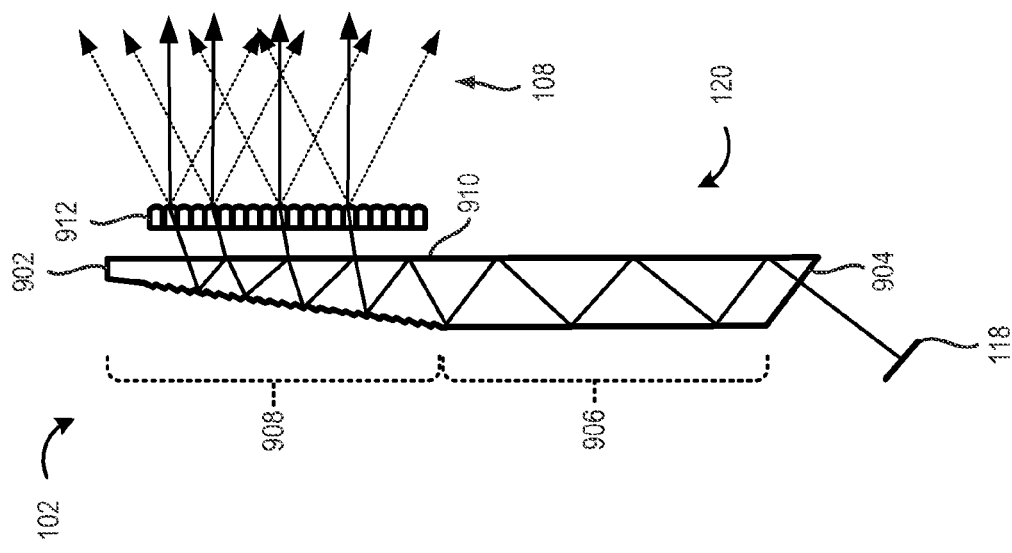
FIG. 9 schematically shows an example homogenizing light guide according to an embodiment of the present disclosure.

FIG. 9 schematically shows a sectional view of another embodiment of an illuminator 102 in the form of a homogenizing light guide 902. Homogenizing light guide 902 is configured to increase an apparent size of light source 118 by receiving light from light source 118 via light receiving surface 904 and spreading it within the light guide. In some embodiments, light source 118 may include an array of surface-emitting lasers 202, and/or may include any other suitable light emitting devices. In one specific example, light source 118 may include a long, thin, array of surface-emitting lasers 202.

Homogenizing light guide 902 takes the form of an optical wedge, though it will be appreciated that any suitable light guide configured to spread and smooth light may be employed without departing from the present disclosure. In the embodiment shown in FIG. 9, light is retained within homogenizing light guide 902 via total internal reflection in total reflection region 906. Upon leaving total reflection region 906, light encounters a light exit region 908 where the opposing faces of the wedge are angled with respect to light emission surface 910, which allows light to exceed the critical angle for total internal reflection relative to light emission surface 910, and thereby escape the optical wedge.

Light passing along homogenizing light guide 902 may travel in a collimated or near-collimated path to light emission surface 910. In some non-limiting examples, light may fan out by 9 degrees or less while traveling between light receiving surface 904 and light emission surface 910. However, light from light source 118 may blend and mingle while traveling through homogenizing light guide 902, so that the light emitted at light emission surface 910 causes the plurality of lasers to appear as a single, larger source located at light emission surface 910.

Figure 10:
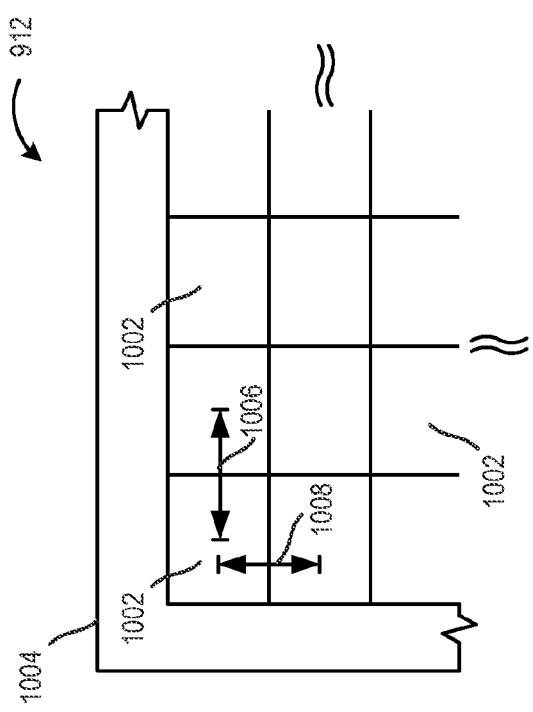
FIG. 10 schematically shows a portion of an example microlens array according to an embodiment of the present disclosure.

After emission from light emission surface 910, the light is received by a microlens array 912 and spread to fill illumination envelope region 128. Microlens array 912 includes a plurality of small lens elements configured to diverge the light and projected it into image environment 106. For example, FIG. 10 schematically shows a front view of a portion of an example microlens array 912 including a plurality of lens elements 1002 retained by a frame 1004. As shown in FIG. 10, each lens element 1002 is defined with reference to a long-axis lens element pitch 1006 that is different from a short-axis lens element pitch 1008, so that each lens element 1002 has an oblong shape. In the embodiment shown in FIG. 10, the pitch is defined with reference to the center of each cell, which may correspond to an apex of each lens surface. Other suitable pitch definitions may be employed in other embodiments without departing from the scope of the present disclosure.

Each of the lens elements 1002 included in microlens array 912 is configured to create the desired angular field of illumination for optical assembly 120. Put another way, each lens element 1002 is configured to impart a selected angular divergence to incoming light. As used herein, divergent light refers to coherent light that is spread from a more collimated beam into a less collimated beam. Divergent light may have any suitable illumination intensity cross-section, as explained in more detail below, and may have any suitable divergence angle, as measured between an optical axis and an extreme ray of the divergent light. The divergence angle may adjusted by adjusting the pitch of the lens elements 1002 within microlens array 912. By spreading the incoming light, microlens array 912 transmits light to all regions within illumination envelope region 128.

Figure 11:
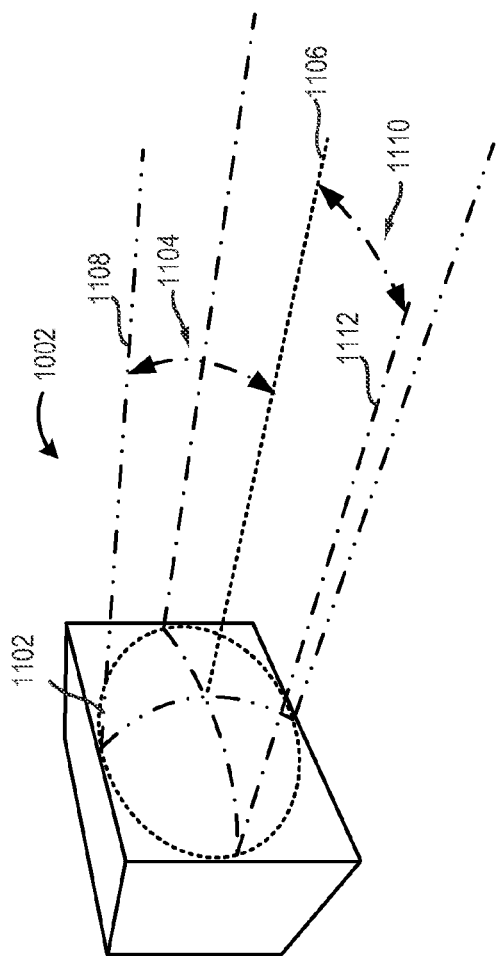
FIG. 11 schematically shows a perspective view of an example lens element in a microlens array according to an embodiment of the present disclosure.

FIG. 11 schematically shows a perspective of an embodiment of an individual lens element 1002 having a convex lens surface 1102. Lens surface 1102 is shaped in part by pitch dimensions for lens element 1002 (e.g., cell dimensions for lens element 1002). In turn, the pitch dimensions for the cell may affect the aspheric nature of lens surface 1102. Consequently, the diverging power of lens element 1002 is established at least in part by the pitch dimensions. In the embodiment shown in FIG. 11, where lens element 1002 is depicted as having an oblong cell shape, convex lens surface 1102 will have a first divergence angle 1104, defined between optical axis 1106 and extreme ray 1108, that will be different from a second divergence angle 1110, defined between optical axis 1106 and extreme ray 1112. When projected into image environment 106, the illumination light, spread in respective directions according to these divergence angles, will in turn establish the boundaries for illumination envelope region 128.

In some embodiments, the degree of divergence that may be realized by lens elements 1002 may be affected by the refractive index of the material from which the lenses are formed. As the lens curvature increases, the light approaches a total internal reflection limit. However, by increasing the index of refraction, a selected divergence angle may be achieved with comparatively less light bending. For example, in some embodiments, lens elements 1002 may be made from optical grade poly(methyl methacrylate) (PMMA), which has a refractive index of approximately 1.49. In other embodiments, lens elements 1002 may be made from optical grade polycarbonate (PC), having a refractive index of approximately 1.6. Lens elements 1002 made from PC may have less curvature to obtain the same divergence angle compared to elements made from PMMA. It will be appreciated that any suitable optical grade material may be used to make lens elements 1002, including the polymers described above, optical grade glasses, etc.

While the embodiment of microlens array 912 shown in FIG. 10 depicts convex lens surfaces included in the array to be facing away from light emission surface 910, in some embodiments, convex lens surface 1102 may be positioned toward light source 118. Positioning convex lens surface 1102 to face light source 118 may result in comparatively higher angles of incidence before the light experiences total internal reflection within the lens element relative to examples where lens surface 1102 faces away from light source 118. In turn, the angular field of illumination, and thus the illumination envelope region, may be larger when lens surface 1102 faces light source 118. Further, positioning lens surface 1102 to face light source 118 may reduce or eliminate some surface coatings (e.g., anti-reflective coatings such as $MgF_2$) that may otherwise be applied if lens surface 1102 in another direction.

The aggregate effect of spreading the coherent light at each lens element 1002 may be to shape the cross-sectional light intensity/irradiance profile from a Gaussian profile associated with incident coherent light into a differently-shaped illumination profile. For example, in some embodiments, as few as six lens elements 1002 may be sufficient to form a desired illumination profile such as the "M"-shaped illumination profile described above.

Figure 12:
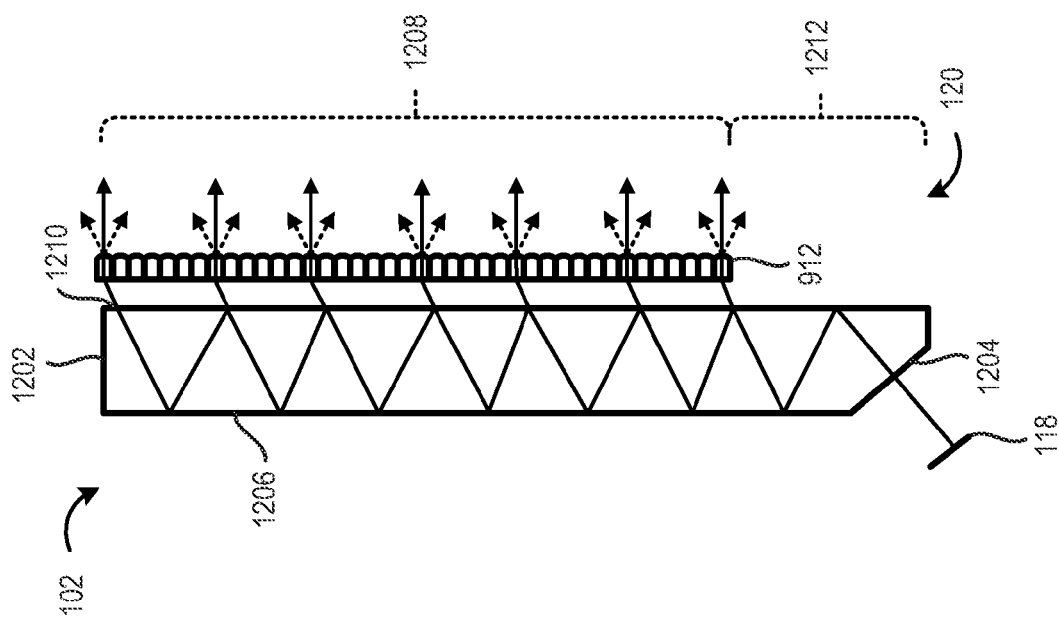
FIG. 12 schematically shows another example homogenizing light guide according to an embodiment of the present disclosure.

FIG. 12 schematically shows another embodiment of illuminator 102 that includes a homogenizing light guide 1202 that has the form of a slab, rather than a wedge. Homogenizing light guide 1202 is configured to receive light from light source 118 via light receiving surface 1204. Light reflects off of a total internal reflection surface 1206 and is directed toward a light emission region 1208 where some of the light is emitted via light emission surface 1210. Light emission surface 1210 is configured as a partial internal reflection surface, reflecting a portion of the light toward total internal reflection surface 1206 for continued propagation while allowing another portion to escape. In some non-limiting examples, light emission surface 1210 may be configured to reflect approximately 95% of incident light at any individual reflection instance, allowing 5% to be emitted to microlens array 912. The reflected light may re-encounter light emission surface 1210 and again experience partial emission of the incident light. Such partial emission instances may be repeated until substantially all of the light received by homogenizing light guide 1202 is emitted via light emission surface 1210. In some embodiments, homogenizing light guide 1202 may include a total internal reflection region positioned opposite total internal reflection surface 1206 to conserve and propagate received light until it reaches light emission region 1208.

Figure 13:
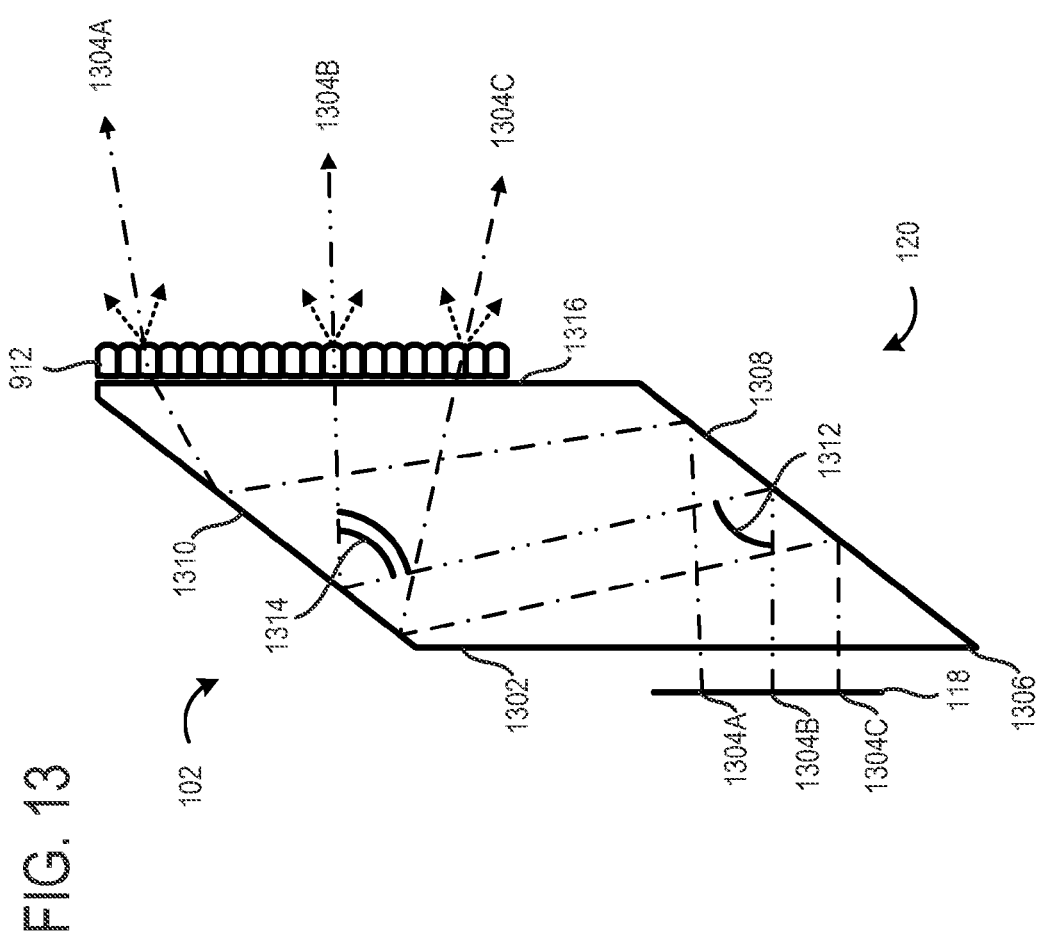
FIG. 13 schematically shows an example reflective light guide according to an embodiment of the present disclosure.

Yet another approach to reshaping the emission envelope and increasing the apparent source size includes the use of a folded optical path within optical assembly 120. FIG. 13 schematically shows another embodiment of illuminator 102. The embodiment shown in FIG. 13 also depicts a cross-section of a reflective light guide 1302 that receives at least a portion of the light from light source 118 and emits the light received to microlens array 912. The light follows a folded light path (shown as light paths 1304A, 1304B, and 1304C in FIG. 13) while transiting reflective light guide 1302. The folded light path shown in FIG. 13 includes complementary angles that allow total internal reflection within reflective light guide 1302. The use of complementary angles within reflective light guide 1302 may provide self-correction of one or more reflection errors caused by misplacement of the light guide. It will be appreciated that in some embodiments, a folded light path may include one or more mirrors suitably positioned to achieve the desired optical path.

In the example shown in FIG. 13, errors that may be introduced by horizontally misplacing reflective light guide 1302 may be canceled by reflection through these complementary angles. For example, light traveling along light path 1304B is received at light entrance 1306 and strikes a first total internal reflection surface 1308, where it is reflected at a first angle 1312 toward a second total internal reflection surface 1310. At second total internal reflection surface 1310, the light is reflected at a second angle 1314 toward light emission surface 1316. The total internal reflection surfaces are arranged with respect to each other so that angle 1312 is complementary with angle 1314, so no angular error exists within the light exiting light emission surface 1316. Thus, potential manufacturing errors or impacts to optical assembly 120 may be self-correcting within an acceptable tolerance.

Figure 14:
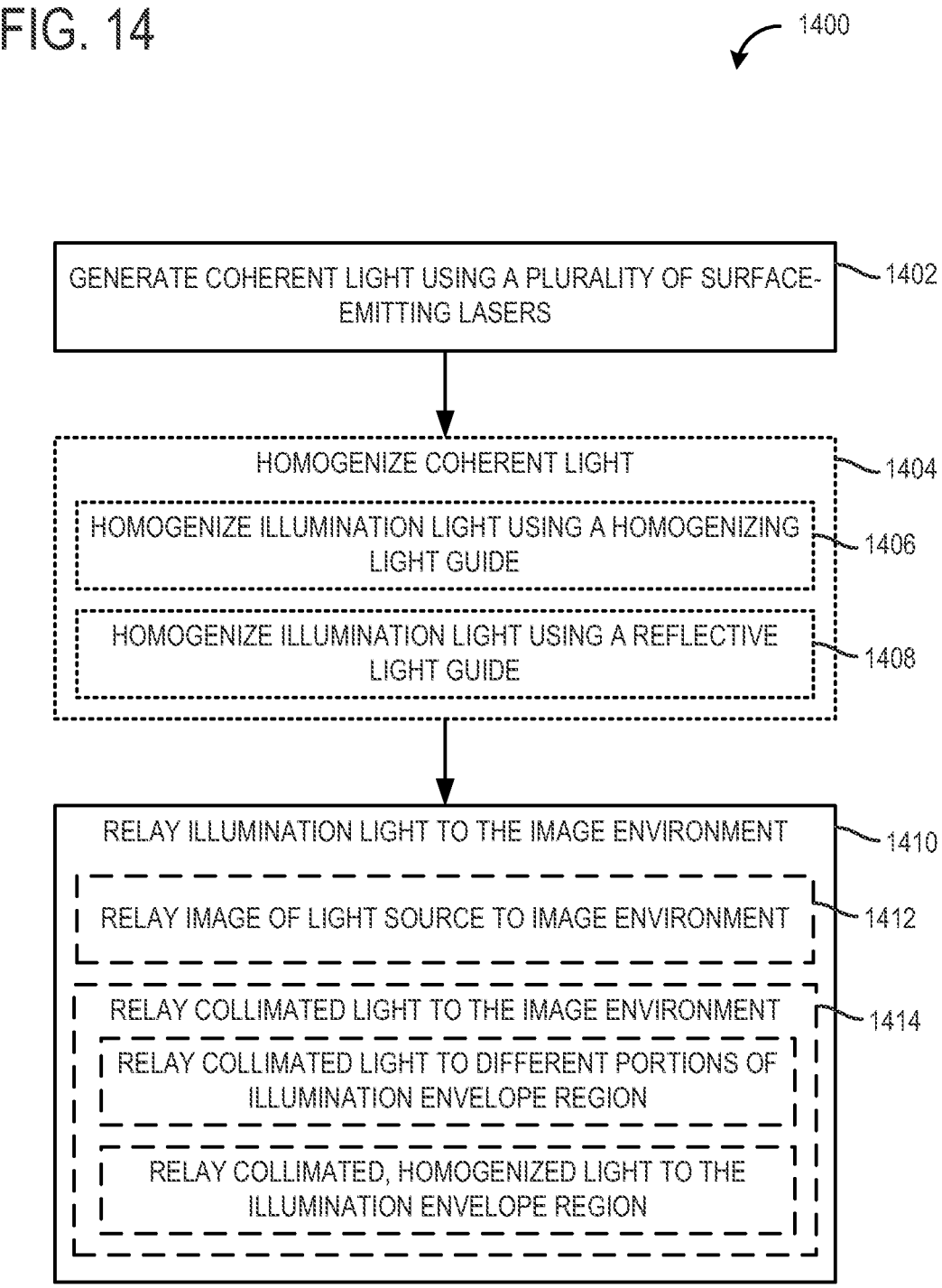
FIG. 14 shows a flowchart illustrating an example method of projecting illumination light into an image environment according to an embodiment of the present disclosure.

FIG. 14 shows a flowchart depicting an embodiment of a method 1400 of projecting illumination light into an image environment. It will be appreciated that method 1400 may be performed by any suitable hardware, including but not limited to the hardware described herein. Further, it will be appreciated that the embodiment of method 1400 shown in FIG. 14 and described below is presented for the purpose of example. In some embodiments, any of the processes described with reference to FIG. 14 may be supplemented with other suitable processes, omitted, and/or suitably reordered without departing from the scope of the present disclosure.

At 1402, method 1400 includes generating coherent light using a plurality of surface-emitting lasers. For example, coherent visible, infrared, or near-infrared light may be generated using suitable surface-emitting lasers like the VCSELs and/or VECSELs described herein.

In some embodiments, method 1400 may include homogenizing the coherent light at 1404. Homogenizing the coherent light may increase the apparent size of the light source and/or may cause the plurality of surface-emitting lasers to appear as a single source. In some of such embodiments, homogenizing the coherent light at 1404 may include, at 1406, homogenizing the illumination light using a homogenizing light guide. Non-limiting examples of homogenizing light guides include homogenizing light wedges and homogenizing light slabs configured to emit light along one surface via partial reflection of the light while totally reflecting light from another surface within the light guide. In other embodiments, homogenizing the coherent light at 1404 may include, at 1408, homogenizing the illumination light using a reflective light guide. Non-limiting examples of reflective light guides include guides that define folded light paths. In yet other embodiments, such homogenization may be omitted.

At 1410, method 1400 includes relaying the illumination light to the image environment. In some embodiments, relaying the illumination light to the image environment may include, at 1412, relaying an image of the light source to the image environment via a lens system In some of such embodiments, the apparent size of the image source may be adjusted by adjusting the focal length, illumination depth region, and illumination envelope region of the lens system.

In some embodiments, relaying the illumination light to the image environment at 1410 may include, at 1414, relaying collimated light to the image environment. For example, as described above, light from each laser of an array of surface-emitting laser may be collimated, and then directed in a different direction than collimated light from other lasers in the array. As another example, a microlens array may be used to relay the light received from a suitable homogenizing light guide to different portions of the illumination envelope region.

In some embodiments, the methods and processes described above may be tied to a computing system of one or more computing devices. In particular, such methods and processes may be implemented as a computer-application program or service, an application-programming interface (API), a library, and/or other computer-program product.

TOF depth camera 100 shown in FIG. 1 depicts an example of a non-limiting embodiment of a computing system that may perform one or more of the methods and processes described above. For example, in the embodiment shown in FIG. 1, light generation module 150 may include instructions executable to operate illuminator 102, and depth information module 152 may include instructions executable to operate image sensor 110 and interpret image information detected by detector 114. While the modules shown in FIG. 1 are illustrated as distinct, standalone entities within TOF depth camera 100, it will be appreciated that the functions performed by such modules may be integrated and/or distributed throughout TOF depth camera 100 and/or a computing device connected locally or remotely with TOF depth camera 100 without departing from the scope of the present disclosure.

TOF depth camera 100 includes a logic subsystem 160 and a storage subsystem 162. TOF depth camera 100 may optionally include a display subsystem 164, input/output-device subsystem 166, and/or other components not shown in FIG. 1.

Logic subsystem 160 includes one or more physical devices configured to execute instructions. For example, logic subsystem 160 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

Logic subsystem 160 may include one or more processors configured to execute software instructions. Additionally or alternatively, logic subsystem 160 may include one or more hardware or firmware logic machines configured to execute hardware or firmware instructions. The processors of logic subsystem 160 may be single-core or multi-core, and the programs executed thereon may be configured for sequential, parallel or distributed processing. Logic subsystem 160 may optionally include individual components that are distributed among two or more devices, which can be remotely located and/or configured for coordinated processing. Aspects of the logic subsystem may be virtualized and executed by remotely accessible networked computing devices configured in a cloud-computing configuration.

Storage subsystem 162 includes one or more physical, non-transitory, devices configured to hold data and/or instructions executable by logic subsystem 160 to implement the herein-described methods and processes. When such methods and processes are implemented, the state of storage subsystem 162 may be transformed—e.g., to hold different data.

Storage subsystem 162 may include removable media and/or built-in devices. Storage subsystem 162 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 162 may include volatile, nonvolatile, dynamic, static, read/write, read-only, random-access, sequential-access, location-addressable, file-addressable, and/or content-addressable devices. In some embodiments, logic subsystem 160 and storage subsystem 162 may be integrated into one or more unitary devices, such as an application-specific integrated circuit (ASIC), or a system-on-a-chip.

It will be appreciated that storage subsystem 162 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

The terms "module" and "program" may be used to describe an aspect of the computing system implemented to perform a particular function. In some cases, a module or program may be instantiated via logic subsystem 160 executing instructions held by storage subsystem 162. It will be understood that different modules and/or programs may be instantiated from the same application, service, code block, object, library, routine, API, function, etc. Likewise, the same module, and/or program may be instantiated by different applications, services, code blocks, objects, routines, APIs, functions, etc. The terms "module" and "program" may encompass individual or groups of executable files, data files, libraries, drivers, scripts, database records, etc.

When included, display subsystem 164 may be used to present a visual representation of data held by storage subsystem 162. This visual representation may take the form of a graphical user interface (GUI). As the herein described methods and processes change the data held by the storage subsystem, and thus transform the state of the storage subsystem, the state of display subsystem 164 may likewise be transformed to visually represent changes in the underlying data. Display subsystem 164 may include one or more display devices utilizing virtually any type of technology. Such display devices may be combined with logic subsystem 160 and/or storage subsystem 162 in a shared enclosure, or such display devices may be peripheral display devices.

When included, input/output-device subsystem 166 may be configured to communicatively couple the computing system with one or more other computing devices. Input/output-device subsystem 166 may include wired and/or wireless communication devices compatible with one or more different communication protocols. As non-limiting examples, input/output-device subsystem 166 may be configured for communication via a wireless telephone network, or a wired or wireless local- or wide-area network. In some embodiments, input/output-device subsystem 166 may allow the computing system to send and/or receive messages to and/or from other devices via a network such as the Internet. Input/output-device subsystem 166 may also optionally include or interface with one or more user-input devices such as a keyboard, mouse, game controller, camera, microphone, and/or touch screen, for example.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A time-of-flight depth camera configured to collect image data from an image environment illuminated by illumination light, the time-of-flight depth camera comprising:
   a light source including a plurality of surface-emitting lasers configured to generate coherent light, the light source comprising an arrangement of the plurality of surface-emitting lasers in a rectangular shape;

a lens system configured to project an image of the light source to the image environment by transmitting collimated light emitted from a first surface-emitting laser to the image environment in a different direction than collimated light emitted from a second surface-emitting laser, the lens system comprising:

a first stage positioned to condense light received from the light source, and a second stage positioned to receive light from the first stage, the second stage being configured to relay the image of the light source into the image environment to illuminate the image environment; and an image sensor configured to detect at least a portion of return light reflected from the image environment.

2. The time-of-flight depth camera of claim 1, where at least one of the plurality of surface-emitting lasers is selected from the group consisting of vertical external cavity surface-emitting lasers (VECSELs) and vertical-cavity surface-emitting lasers (VCSELs).

3. The time-of-flight depth camera of claim 1, where the lens system has an f-number configured to provide an illumination depth region of at least 0.5 m.

4. The time-of-flight depth camera of claim 1, further comprising a Schmidt plate positioned at an entrance pupil of the lens system.

5. The time-of-flight depth camera of claim 1, where each of the plurality of surface-emitting lasers generates coherent light having an angular divergence.

6. The time-of-flight depth camera of claim 1, where the lens system includes a single substrate having a light receiving surface configured to receive light from the light source and a light emitting surface configured to transmit light to the image environment, where the light receiving surface includes a first pattern encoding a first prescription for the first stage, and where the light emitting surface includes a second pattern encoding a second prescription for the second stage.

7. The time-of-flight depth camera of claim 1, where the first stage is further configured to shape the coherent light into light having a light profile that is more intense at a location farther from an optical axis of the light than at a location closer to the optical axis of the light.

* * * * *